United States Patent [19]

Antelman

[11] Patent Number: 5,098,582

[45] Date of Patent: Mar. 24, 1992

[54] DIVALENT SILVER OXIDE BACTERICIDES

[75] Inventor: Marvin S. Antelman, Rehovot, Israel

[73] Assignee: N. Jonas & Co., Inc., Bensalem, Pa.

[21] Appl. No.: 697,782

[22] Filed: May 9, 1991

[51] Int. Cl.$^5$ ............................................... C02F 1/50
[52] U.S. Cl. .................................. 210/759; 210/764; 210/765; 422/28; 422/905
[58] Field of Search ........ 210/757, 758, 759, 764–766, 210/668, 501; 422/98, 905; 424/618

[56] References Cited

U.S. PATENT DOCUMENTS

| | | | |
|---|---|---|---|
| 1,557,234 | 10/1925 | Bechhold | 210/764 |
| 2,508,602 | 5/1950 | Goetz | 210/764 |
| 2,521,713 | 9/1950 | Goetz | 210/764 |
| 4,092,245 | 5/1978 | Franks et al. | 424/618 |
| 4,492,618 | 1/1985 | Eder | 210/764 |
| 4,749,537 | 6/1988 | Gautschi et al. | 210/764 |

Primary Examiner—Thomas Wyse
Attorney, Agent, or Firm—Salter & Michaelson

[57] ABSTRACT

Divalent silver oxide provides a source for divalent bactericidal silver ions in the presence of persulfate. This oxide is especially effective when applied to water used in industrial cooling towers, hot tubs and swimming pools and conforms to stringent EPA requirements of 100% kills of 100K/cc *Streptococcus faecalis* within 10 minutes. The oxide also can be used in water with exceptionally high salt content without halide curdy precipitate formation and will not stain the skin of users who may inadvertently be exposed to it.

4 Claims, No Drawings

DIVALENT SILVER OXIDE BACTERICIDES

BACKGROUND OF THE INVENTION

The bactericidal properties of divalent silver for water treatment is the subject of U.S. Pat. No. 5,017,285 of the present inventor. In said patent the inventor has claimed a method for controlling the growth of bacteria in swimming pool and industrial cooling tower waters utilizing soluble divalent silver complexes with inorganic ligands which exhibit distinct advantages over monovalent silver in terms of cost, efficacy, concentration and stability. It was found that water sources having sodium chloride present at concentrations as high as 100 PPM would not precipitate insoluble chloride in contradistinction to monovalent silver at the same concentration of parts per million of available silver. While said divalent silver compounds are effective in brackish waters and swimming pools having these concentrations of salt, a major problem arises under conditions of higher salt concentrations and in special situations where higher halide concentrations are likely to prevail.

The situations where higher halide concentrations are likely to occur are manifold. Among the more prevalent cases are when sea water is used in swimming pools, which is a common occurrence at sea resorts, when brackish water is employed in cooling towers, and when swimming pools are maintained with calcium chloride in order to mineralize them. Another case is hot tubs with mineral salts.

When the aforementioned divalent silver compounds are added to said high halide concentration waters, a white curdy precipitate occurs which clouds the water to which it is added and makes it aesthetically unacceptable, even though the divalent silver performs its bactericidal action under these conditions of use. Accordingly, it was desirable to explore and test divalent silver compounds which would not produce a curdy halide precipitate in water containing high concentrations of salt or other halide salts.

Another problem associated with the divalent silver solutions is that care must be taken that they not contact the skin as they leave unsightly and difficult to remove silver stains. Although this problem was ancillary to the halide curdy precipitation problem, it was preferable that the divalent silver compound selected be more amenable to customer handling and remove the risk of, or minimize, silver staining.

OBJECT OF THE INVENTION

The main object of this invention is to provide for a bactericidal divalent silver agent which will not form non-aesthetic curdy precipitates in high halide containing waters utilized for industrial cooling, swimming pools and hot tubs. Still another object of this invention is to provide for a divalent silver bactericidal medium which will not leave persistent stains on the user's skin through accidental contact, or minimize said risk.

SUMMARY OF THE INVENTION

This invention relates to methods for keeping the water in swimming pools, hot tubs and industrial cooling installations free from bacteria. Said methods relate to bactericidal agent additions of the compound AgO, i.e., divalent silver oxide, in contradistinction to the monovalent oxide of silver, $Ag_2O$.

Divalent silver oxide, prepared in the laboratory, and purchased commercial materials were evaluated in the presence of persulfates to see whether they were effective at various concentrations in inhibiting bacterial growth. It was found that they inhibited growth of mixed coliforms at concentrations as low as 0.5 PPM of AgO within 5 minutes. The addition of persulfates to swimming pools is standard practice, and silver(II) oxide exhibits its bactericidal action in their presence at persulfate levels of 10 PPM. In the absence of persulfate, 100% kills do not occur.

A plausible explanation for this is based on a plethora of references in the chemical literature as to the nature and stability of silver ions so that the reaction mechanism of this invention may be represented as follows:

$$AgO + H_2O = Ag^{2+} + 2OH$$

In the absence of oxidizing agents such as the persulfates silver(II), oxide's dissociation into divalent silver ions is unlikely to occur (J.A. McMillan, "Higher Oxidation States of Silver", Chemical Reviews, 1962, 62 p.67).

Silver(II) oxide was added at concentrations between 110 PPM to water containing 5000 PPM sodium chloride. No curdy precipitate occurred. The oxide sunk to the bottom of the container and gradually formed a white surface layer of chloride on the surface. The chloride did not in any way interfere with the efficacy of the oxide and was evaluated at said level of salt at a pH of 7.5, killing 100% of the bacterium Streptococcus faecalis (100,000 colonies/cc.) within 10 minutes.

A solution of divalent silver phosphate containing 5% silver by weight was prepared and tested for skin reaction on the human hand by exposing it to a drop of this solution 1 mm in diameter for 2 seconds, after which the skin was washed. Upon exposure to sunlight, the skin developed a lasting brown stain which lasted about 2 weeks. The procedure was repeated with solid AgO and failed to produce any stain.

The action of the divalent silver oxide is unique in its bactericidal action, for while it is known that monovalent silver salts exhibit said action, EPA protocols for swimming pools, which require killing 100K/cc cultures of bacterial within 10 minutes to levels of 100%, are not achievable at the same concentrations of silver. Indeed this was tested with silver lactate adjusted to basic pH's where only monovalent silver oxide can exist, and even at silver concentrations of 10.0 PPM in the presence of 10 PPM potassium monopersulfate the resulting bacterial colonies remaining were designated TNTC (too numerous to count).

Other objects and features of the present invention will become apparent to those skilled in the art when the present invention is considered in view of the accompanying examples. It should, of course, be recognized that the accompanying examples illustrate preferred embodiments of the present invention and are not intended as a means for defining the limits and scope of the present invention.

DESCRIPTION OF THE PREFERRED EMBODIMENTS

As illustrative of the compositions of this invention in their preferred embodiments is the following:

EXAMPLE I

Silver(II) oxide was prepared by modifying the procedure described by Hammer and Kleinberg in *Ino-*

*roanic Syntheses* (IV) 12. A stock solution was made containing 24.0 grams each of potassium peroxydisulfate and sodium hydroxide in 500 cc. distilled water. Into 20 ml. vials were weighed quantities of silver nitrate containing 1.0 gram of silver. Now 50 ml. of the aforementioned stock solution were heated in a 100 ml. beaker, and the contents of one of the vials was added to the solution after it had attained the temperature of 85 C. The beaker was then maintained at 90 C. for 15 minutes. The subsequent Ag(II) oxide which formed as a deep black precipitate was washed and decanted 4 times with distilled water and then dried to remove all moisture.

The resulting product was submitted to a bactericidal evaluation prescreening following "good laboratory practice" regulations as set forth in Federal Regulations (FIFRA and ffdca/40 CFR 160, May 2, 1984). The protocol consisted of exposures to (treptococcus faecalis utilizing AOAC (15th) 1990:965:13 at two exposure times, 5 and 10 minutes. The water solution tested was adjusted to pH=7.5 and 10 mg./L of potassium monopersulfate. Oxone (registered trademark of duPont Chemicals) was added to the water, and 100% kills were obtained at 5 and 10 minutes at Ag(II) oxide concentrations of 5.0 and 10.0 PPM. At a concentration of 1.0 PPM, 99+% kills were obtained at 5 minutes, and 100.0% kills at 10 minutes.

EXAMPLE II

The aforementioned procedure described in Example I was repeated excepting that the bactericidal evaluation was performed with E. Coli coliforms at 100,000 colonies per cc. in water containing sodium chloride at 5000 PPM utilizing Ag(II)0 at a concentration of 2.0 PPM. 100% kills were obtained within 5 minutes.

EXAMPLE III

The procedure described in Example II was repeated except that the source of Ag(II) oxide utilized was commercial material obtained from Whittaker Power Storage Systems, Denver, Colorado, and utilizing sodium peroxydisulfate as well as Oxone at 10 mg./L. without a pH adjustment of the distilled water used. In each case, 100.0% kills were obtained at concentrations of 0.5 and 1.0 PPM of Ag(II) oxide at 5 and 10 minute exposures and at 0.3 PPM Ag(II) oxide at the 10 minute exposure. When the water was neutralized to a pH of 7, 100.0% kills were obtained at 1.0 PPM Ag(II) oxide at both the 5 and 10 minute exposures. In all the tests utilized in this example, two plates were used for confirmation, and blanks were run on both the dilution water and persulfate.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by these claims.

What is claimed is:

1. A method for controlling the growth of bacteria in the water of swimming pools, hot tubs and industrial cooling towers which comprises adding to the water divalent silver oxide in the presence of an oxidizing agent so as to provide a source of divalent silver ions.

2. A method as claimed in claim 1 where the oxidizing agent is a persulfate.

3. A method according to claim 1 which can be utilized in said waters where they contain sodium chloride concentrations as high as 5,000 parts per million or an aggregate amount of halide salts equivalent to the chloride concentration of said salt.

4. A method according to claim 1 which will not leave silver stains on the user's unprotected skin due to inadvertent exposure.

* * * * *